United States Patent [19]
Watanabe

[11] Patent Number: 6,018,773
[45] Date of Patent: Jan. 25, 2000

[54] METHOD AND APPARATUS FOR TRANSFERRING INFORMATION TO A PLURALITY OF OFFICES IN SERIES IN A NETWORK

[75] Inventor: Kimio Watanabe, Kawasaki, Japan

[73] Assignee: Fujitsu Limited, Kanagawa, Japan

[21] Appl. No.: 09/055,370

[22] Filed: Apr. 3, 1998

Related U.S. Application Data

[62] Division of application No. 08/601,079, Feb. 14, 1996.

[30] Foreign Application Priority Data

Jul. 19, 1995 [JP] Japan .................................. 7-182912

[51] Int. Cl.⁷ .............................. G06F 13/38; G06F 15/17
[52] U.S. Cl. ............................................ 709/239; 709/253
[58] Field of Search ........................ 340/825.02; 370/408, 370/429; 395/200.82, 200.83; 709/252, 253, 238, 220, 239, 244, 237

[56] References Cited

U.S. PATENT DOCUMENTS

| | | | |
|---|---|---|---|
| 4,347,498 | 8/1982 | Lee et al. | 340/825.02 |
| 4,740,954 | 4/1988 | Cotton et al. | 370/60 |
| 4,866,668 | 9/1989 | Edmonds et al. | 364/900 |
| 4,885,742 | 12/1989 | Yano | 370/85.2 |
| 5,005,122 | 4/1991 | Griffin et al. | 364/200 |
| 5,224,100 | 6/1993 | Lee et al. | 370/94.3 |
| 5,276,899 | 1/1994 | Neches | 395/800 |
| 5,291,612 | 3/1994 | Sosic et al. | 395/800 |
| 5,331,637 | 7/1994 | Francis et al. | 370/54 |
| 5,459,725 | 10/1995 | Bodner et al. | 370/60 |
| 5,528,583 | 6/1996 | Acampora et al. | 370/54 |
| 5,541,927 | 7/1996 | Kristol et al. | 370/94.2 |
| 5,740,170 | 4/1998 | Andou et al. | 370/390 |

FOREIGN PATENT DOCUMENTS

| | | |
|---|---|---|
| 0 234 618 | 9/1987 | European Pat. Off. . |
| 0 689 325 A2 | 12/1995 | European Pat. Off. . |
| 2 173 977 | 10/1986 | United Kingdom . |
| WO 87/02155 | 4/1987 | WIPO . |

OTHER PUBLICATIONS

K. Kohda, K.Harada, S. Matsuoka, "SEMF Software Architecture for SDH Transmission Equipment", Japanese Technical Report of IEICE, IN93–41, pp. 41–46.

*Primary Examiner*—Mark H. Rinehart
*Attorney, Agent, or Firm*—Helfgott & Karas, PC.

[57] ABSTRACT

A method of transferring information to a plurality of offices connected in series in a network includes the following steps. A step (a) is transferring the information from a server office to an intermediate office being substantially intermediate in the plurality of offices. A step (b) is setting the intermediate office which received the information in the step (a) to the server office. A step (c) is virtually dividing the plurality of offices into two groups which respectively include the server offices. And, a step (d) is repeating the steps (a) to (c) for each of the two groups.

7 Claims, 16 Drawing Sheets

FIG. 1
PRIOR ART
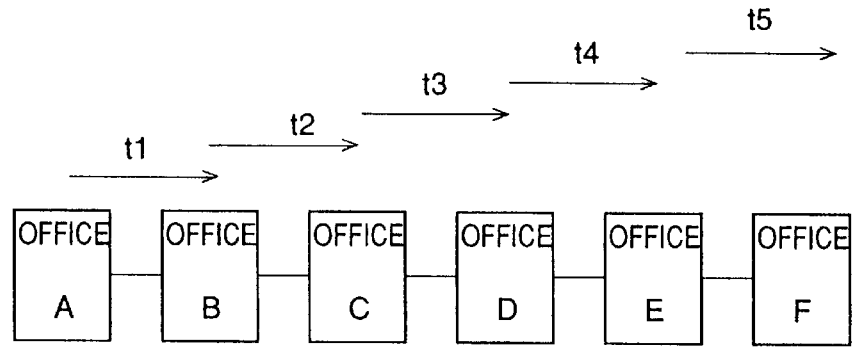
FIG. 2
PRIOR ART
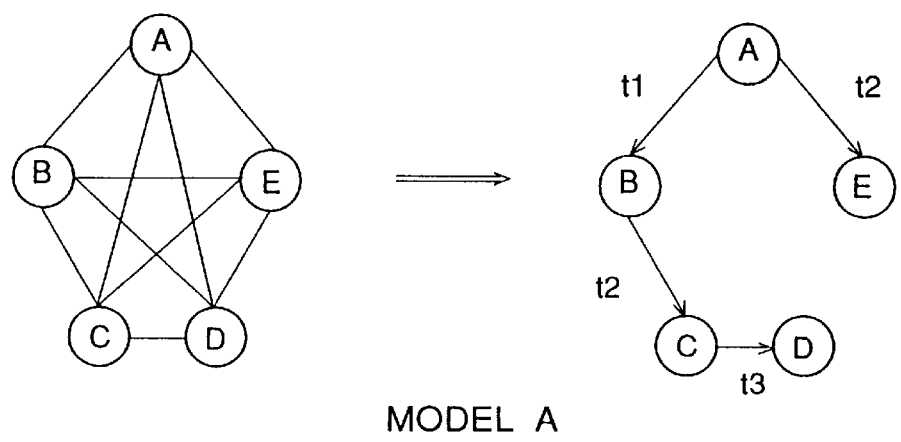
MODEL A
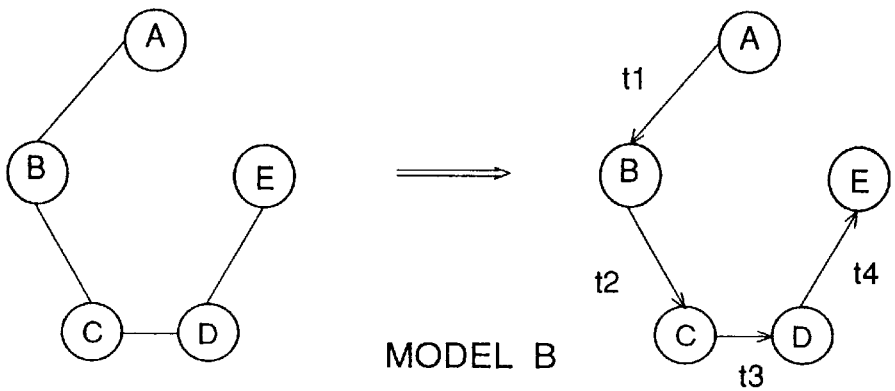
MODEL B

| FLAG | ADDRESS | CONTROL | INFORMATION | FCS | FLAG |

FLAG : 01111110 (8 bit)
ADDRESS : COMMUNICATION APPARATUS ID INFORMATION (8 bit)
CONTROL : TRANSMISSION-ORDER CONTROL,etc,INFORMATION (8 bit)
INFORMATION : MONITOR-AND-CONTROL INFORMATION (8 bit x n) n:INTEGER
(DOWNLOAD INFORMATION)
FCS : ERROR DETECTION (16 bit)

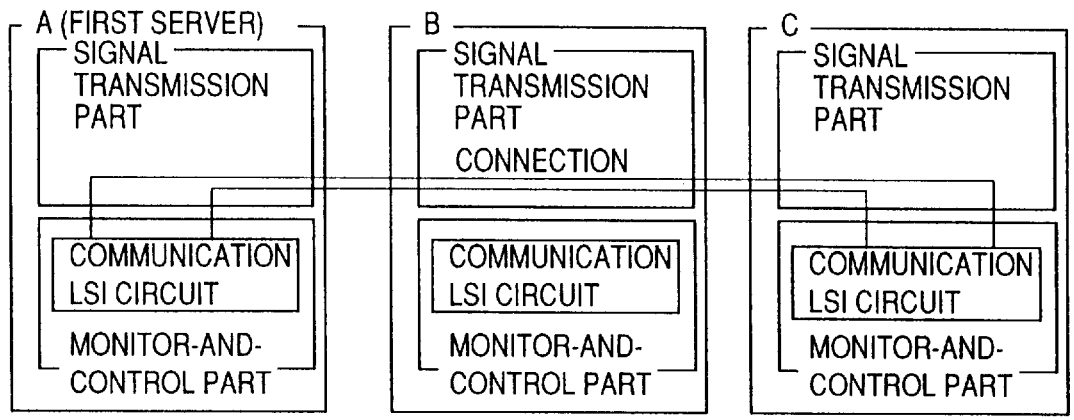

(CONFIGURATION OF A CONNECTION)

FIG. 11

ADDRESS

| 1 | 2 | 3 | 4 | 5 | 6 | 7 |
|---|---|---|---|---|---|---|
| OFFICE A | OFFICE B | OFFICE C | OFFICE D | OFFICE E | OFFICE F | Null |

METHOD AND APPARATUS FOR TRANSFERRING INFORMATION TO A PLURALITY OF OFFICES IN SERIES IN A NETWORK

This application is a division of Ser. No. 08/601,079, filed Feb. 14, 1996, now allowed.

BACKGROUND OF THE INVENTION

1. Field of the Invention

The present invention generally relates to a method and apparatus for transferring information, and more particularly, to a method and apparatus for transferring information which will efficiently download the same information, for example, software, to a plurality of offices constructing a network.

The present invention is also directed to a method and apparatus for transferring information which downloads special information to a given office.

2. Description of the Related Art

A telecommunication network becomes complex in order to provide a variety of services. Therefore, it becomes important to manage such a network. Network management is currently developed also in international standardization. For example, in the international telecommunication union (ITU-T), standardization of an operation of a telecommunication carrier and a telecommunication management network (TMN) for network management is carried out. Also, supervision and control of the telecommunication is standardized.

For such network management, respective transmission equipment in offices constructing the network has a managing function, and the transmission equipment in the offices is managed by a given operation center. In general, each office's managing function is constructed with software. When the network is initially constructed, or when the managing function is added and changed, it is necessary to install new software of the managing function to the transmission equipment of the respective offices.

In the prior art, for changing the software of the transmission equipment in a remote office, a maintenance man changes a ROM of the equipment in the remote office. However, for developing the above-mentioned management network, a software download technique, namely a technique loading or updating the software of the remote office by using a communication line, is now indispensable.

At present, several download methods for a network managing system are known. In a typical method, a server office sequentially downloads the software to a plurality of offices on the network in a relay transmission form. FIG. 1 shows an illustration for explaining that prior-art downloading method. FIG. 1 shows a linear-structure network model in which offices A to F are connected in series. In the prior-art downloading method, the office A downloads the information to respective offices, or the office A initially downloads to the adjacent office B, next, the office B downloads to the adjacent office C, and at last, the office E downloads to the office F.

However, in the above-mentioned prior-art method, there is the following problem. A download time increases in proportion to a number of offices in the network. For example, when the download time for one office is 10 minutes, it takes 1000 minutes for downloading of 100 offices. This method is represented by an O(n) method in which a total download time for n offices is n times the download time for one office.

In an ideal downloading method, it is known that the total download time for n offices is approximately $\log_2 n$ times the download time for one office. For example, when the download time for one office is 10 minutes, it takes approximately 70 ($10 \times \log_2 100$) minutes for downloading of 100 offices. This method is represented by an $O(\log_2 n)$ method.

For realizing the ideal downloading method, another method is proposed in a reference "SEMF software architecture for SDH transmission equipment", Japanese technical report of the Institute of Electronics, Information and Communication engineers (IEICE), IN93-41 (1993-08), pp.41–46. In this method, the download of the $O(\log_2 n)$ method may be carried out only in a limited network model.

FIG. 2 shows an illustration for explaining the prior-art downloading method disclosed in the above-mentioned reference. There are two models, a model A indicates a network model in which all offices are connected with each other by lines, and a model B indicates a network model in which all offices are connected in series (linear structure) by the lines. In this method, when the software is downloaded to any office, this office operates as a server, and downloads to an adjacent office. The download is carried out in an undefined order. Therefore, this method is applicable to the model A, but is not applicable to the model B.

When the method disclosed in the above-mentioned reference is applied to the model A, the software can be downloaded to all offices by 3-downloading operations. For example, after the downloading operation from the office A to the office B is carried out (t1), the downloading operation from the office A to the office E and the downloading operation from the office B to the office C can simultaneously be carried out (t2). Therefore, the download may be performed by the $O(\log_2 n)$ method.

However, to the model B in FIG. 2, the method in the above-mentioned reference can not be applied. In the model B, after the downloading operation from the office A to the office B is carried out (t1), the downloading operation from the office A to the office E and the downloading operation from the office B to the office C cannot simultaneously be carried out because of traffic overlapping in network lines. Therefore, for downloading of all offices, 4-downloading operations are required. In the model B, the download cannot be performed by the $O(\log_2 n)$ method.

As discussed above, the prior-art downloading method in the above-mentioned reference is applicable to only a case where all offices are connected with each other by the lines, and a case where a network model is identical to a model supporting the $O(\log_2 n)$ method. Therefore, in the prior-art downloading method, there is a problem in that the download time increases. When the download time increases, the time for the maintenance man waiting for the downloading also increases, and, thus, network-management efficiency is degraded.

SUMMARY OF THE INVENTION

It is an object of the present invention to provide an information transferring method and apparatus for efficiently downloading information data to a plurality of offices in any network architecture, in which the disadvantages described above are eliminated.

The object described above is achieved by a method of transferring information to a plurality of offices connected in series in a network, the method comprising the steps of: (a) transferring the information from a server office to an intermediate office being substantially intermediate in the plurality of offices; (b) setting the intermediate office which received the information in the step (a) to the server office; (c) virtually dividing the plurality of offices into two groups which respectively include the server offices; and (d) repeating the steps (a) to (c) for each of the two groups.

The object described above is also achieved by an apparatus for transferring information from a server office to a plurality of offices connected in series in a network, the apparatus comprising: a receiving circuit for receiving the information; a transferring circuit for transferring the information to an intermediate office being substantially intermediate in the plurality of offices.

According to the above method and apparatus, the server office transfers the information to the intermediate office being substantially intermediate in the plurality of offices connected in series. In this case, a total download time for n offices is positively given by approximately $\log_2 n$ times a download time for one office. Therefore, the total download time may be extremely reduced as compared to a prior-art method taking n times the download time for one office.

The object described above is also achieved by the method mentioned above, wherein the method further comprises a step of previously storing in a memory which office in the plurality of offices is the intermediate office.

The object described above is also achieved by the apparatus mentioned above, wherein the apparatus further comprises a memory storing which office in the plurality offices is the intermediate office.

According to the above method and apparatus, the information for the intermediate office is previously stored in the memory. Therefore, the downloading method and apparatus according to the present invention may easily be constructed.

The object described above is also achieved by the method mentioned above, wherein the step (a) further comprises a step of calculating which office in the plurality of offices is the intermediate office based on a network architecture.

The object described above is also achieved by the apparatus mentioned above, wherein the apparatus further comprises a calculating circuit for determining which office in the plurality offices is the intermediate office based on a network architecture.

According to the above method and apparatus, which office in the plurality of offices is the intermediate office is calculated based on the network architecture. Therefore, even when the network architecture is changed, a downloading operation may easily be carried out only by transferring information of the network architecture to each office.

The object described above is also achieved by the method mentioned above, wherein the method further comprises a step of dividing the information into a plurality of blocks, and every time one block of the blocks is received in each office, transmitting the one block to a next office.

The object described above is also achieved by the apparatus mentioned above, wherein the apparatus further comprises a parallel-process control circuit for dividing the information into a plurality of blocks, and transmitting one block of the blocks to a next office every time the one block is received.

According to the above method and apparatus, the information is divided into the plurality of blocks. In each office, every time the one block is received, the one block is transferred to the next office. Namely, for each block, transmission and reception are carried out in parallel. Therefore, the total download time may be further reduced.

The object described above is also achieved by the method mentioned above, wherein the method further comprises the steps of: returning a response indicating a regular completion of receiving the information from a first office which received the information to a second office which transferred the information to the first office; and receiving a plurality of the responses in a third office from other offices following the third office, and returning the plurality of responses from the third office to a fourth office which previously transferred the information to the third office.

The object described above is also achieved by the apparatus mentioned above, wherein the apparatus further comprises: a first responding circuit for returning a response indicating a regular completion of receiving the information to an office which transferred the information to the apparatus; Iand a second responding circuit for receiving a plurality of the responses from other offices and for returning the plurality of responses to an office which previously transferred the information to the apparatus.

According to the above method and apparatus, when the information is received, the response of the regular completion is returned to the server office of the information. And, when the plurality of responses from other offices are received, the plurality of responses are transferred to an upper-level server office. Therefore, without degrading efficiency of the downloading operation, the response of the regular completion may be returned.

The object described above is also achieved by the method mentioned above, wherein the step (a) comprises a step of downloading software to the intermediate office.

The object described above is also achieved by the apparatus mentioned above, wherein the transferring circuit comprises a circuit for downloading software to the intermediate office.

According to the above method and apparatus, setup and update operations of a monitor-and-control apparatus may easily be carried out.

Other objects and further features of the present invention will be apparent from the following detailed description when read in conjunction with the accompanying drawings.

BRIEF DESCRIPTION OF THE DRAWINGS

FIG. 1 shows an illustration for explaining a prior-art downloading method;

FIG. 2 shows an illustration for explaining another prior-art downloading method;

FIG. 9A and FIG. 9B show a method of establishing a connection in the downloading method according to the present invention. FIG. 9A shows a configuration of the connection, and FIG. 9B shows a control sequence;

FIG. 9C shows a configuration of the connection, and FIG. 9D shows a control sequence;

FIG. 11 shows a memory configuration storing topology information of the network shown in FIG. 7;

DESCRIPTION OF THE PREFERRED EMBODIMENTS

First, a description will be given of a configuration of a downloading apparatus before a description of embodiments of the downloading method according to the present invention.

Figure 3:
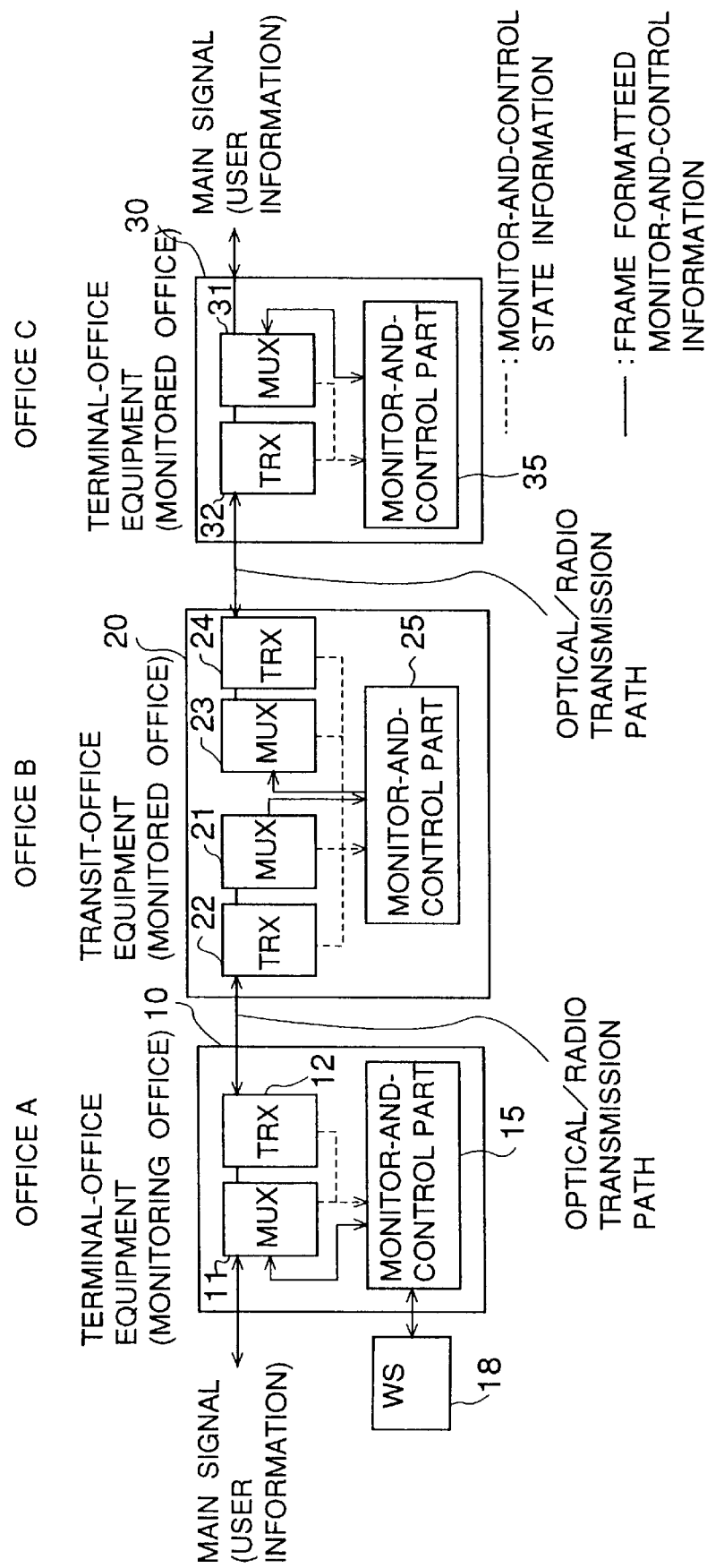
FIG. 3 shows a block diagram of a configuration example of a monitor-and-control system.

FIG. 3 shows a block diagram of a configuration example of a monitor-and-control system. In FIG. 3, a network constructed with three offices A, B and C is shown. The three offices are connected in series (linear structure) through optical transmission paths or radio transmission paths.

In the network, information from a plurality of users connected to the office A is multiplexed in the office A, and multiplexed information is transmitted to the office C through the office B. In the office C, the multiplexed information is demultiplexed, and demultiplexed information is transmitted to a plurality of users connected to the office C. In the opposite way, the users belonging to the office C can also transmit the information to the users belonging to the office A. Further, the users belonging to the offices A, C can communicate with users belonging to the office B. For a multiplexing method, time-division multiplexing, frequency-division multiplexing, code-division multiplexing, etc., are usable.

The office A and the office C respectively have terminal-office equipment 10 and terminal-office equipment 30, and the office B has transit-office equipment 20. The terminal-office equipment 10, 30 respectively include multiplex/demultiplex parts (MUXs) 11, 31 for multiplexing the user information and demultiplexing a multiplexed signal, and further respectively include signal-transmission parts (TRXs) 12, 32 for transmitting and receiving the multiplexed signal. The transit-office equipment 20 in the office B includes a signal-transmission part 22 and a multiplex/demultiplex part 21 for communicating with the office A, and further includes a signal-transmission part 24 and a multiplex/demultiplex part 23 for communicating with the office B.

The equipment 10, 20, 30 in the offices A, B, C further respectively includes monitor-and-control parts 15, 25, 35 for monitoring communication apparatuses such as a signal transmission part and a multiplex/demultiplex part. Each monitor-and-control part detects an operation condition and any trouble in the communication apparatuses and any trouble in communication lines. Detected information is processed as monitor-and-control information. The monitor-and-control information is converted to serial information, and is transmitted to an upper-level office through the communication lines.

In the example shown in FIG. 3, the monitor-and-control information generated in the offices B, C is transmitted to the office A. In this way, the communication apparatuses in the office B and the office C are monitored by the office A. In a practical operation, the three offices including the office A are monitored and controlled by a work station 18 provided in the office A.

Figure 4:
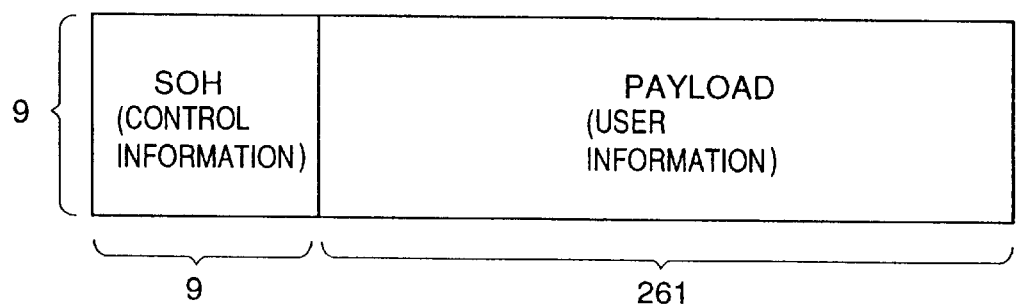
FIG. 4 shows an example of a format of a multiplexed signal passing through a transmission path between offices.

FIG. 4 shows an example of a format of the multiplexed signal passing through the transmission path between the offices. The format shown in FIG. 4 is called a synchronous transport module level 1 (STM-1), and is formed by user information (1.5 Mbps, 2 Mbps) being multiplexed. The STM-1 is constructed with a section over head (SOH) of 9 rows×9 columns and a payload of 9 rows×261 columns, where 1 row×1 column indicates 64 kbps. The user information is carried in the payload. An area of the SOH is used by a network operator. The above-mentioned monitor-and-control information is transmitted on a given channel in the SOH. Therefore, the user information and the monitor-and-control information of the offices are multiplexed, and a multiplexed signal is transmitted through the one communication line.

When the network architecture is developed, or when functions of the equipment in the offices are added and changed, new software for the monitor-and-control part needs to be loaded. The software downloading operation may be carried out through the above-discussed given channel in the SOH for transmitting the monitor-and-control information.

Figure 5:
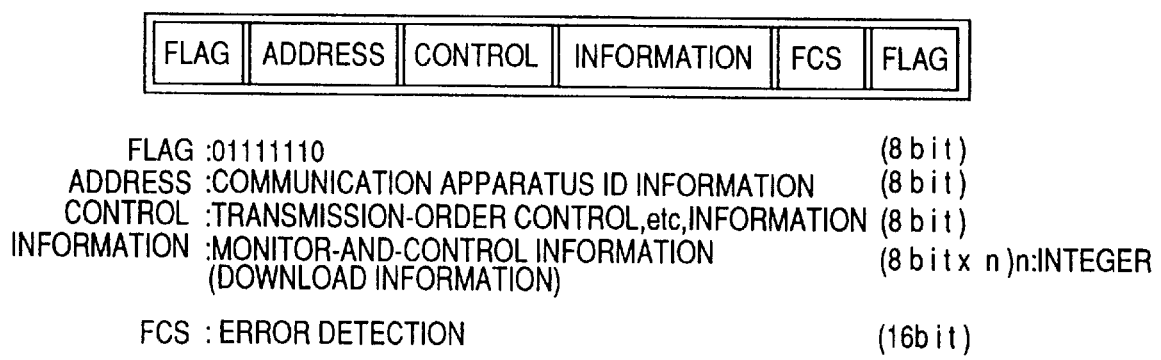
FIG. 5 shows an example of a frame format of monitor-and-control information.

FIG. 5 shows an example of a frame format of the monitor-and-control information. The frame format shown in FIG. 5 uses a conventional HDLC format. When the software is downloaded, download information is set instead of the monitor-and-control information. Generation of such a frame is carried out by a dedicated communication processing apparatus (which may be integrated into an LSI chip).

Figure 6:
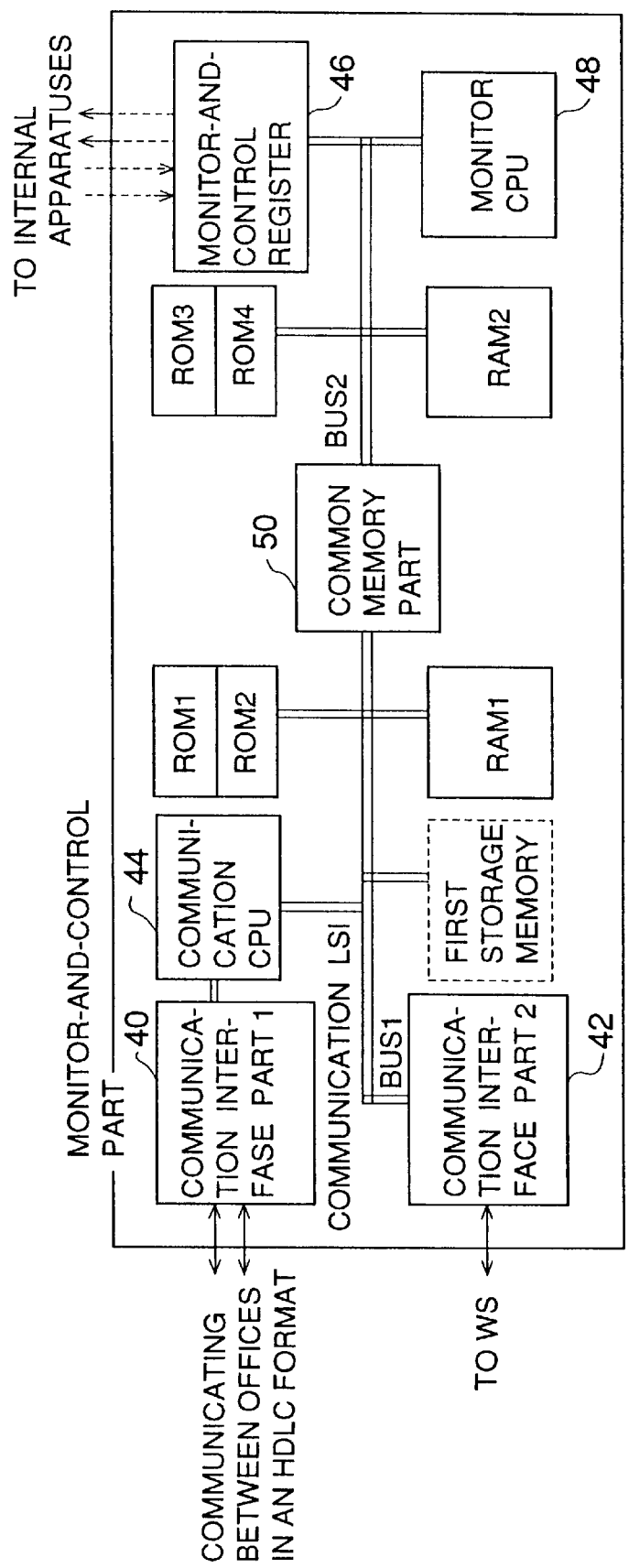
FIG. 6 shows a block diagram of a configuration example of a monitor-and-control part.

FIG. 6 shows a block diagram of a configuration example of the monitor-and-control part. The monitor-and-control parts 15, 25, 35 shown in FIG. 3 have the substantially same configuration. The configuration of the monitor-and-control part shown in FIG. 6 is represented in common for the above three monitor-and-control parts shown in FIG. 3. The monitor-and-control part shown in FIG. 6 includes a first communication interface part 40 (communication LSI chip), a second communication interface part 42, a communication CPU 44, a monitor-and-control register 46, a monitor CPU 48, and a common memory part 50.

Trouble of the apparatus in the equipment and trouble of the communication lines is detected in the monitor-and-control register 46. This monitor-and-control register 46 also has a function of controlling the communication apparatuses. The information from the monitor-and-control register 46 is read in the monitor CPU 48, and is written into the common memory part 50 which can be accessed also by the communication CPU 44 to be transferred to the upper-level office. The communication CPU 44 reads the information written in the common memory part 50, transfers it to the first communication interface part 40, converts it to a given communication frame format (shown in FIG. 5), and transmits it to the upper-level office. The above is a sequence of the monitor-and-control function of the monitor-and-control part.

A function of the communication CPU 44 is operated by an application program stored in ROM1 and ROM2. A function of the monitor CPU 48 is operated by an application program stored in ROM3 and ROM4. By the software downloading operation, the application programs of the communication CPU 44 and the monitor CPU 48 and the dedicated information for the apparatus in the office (office information) are changed through communication lines.

Next, a downloading operation in the network shown in FIG. 3 will be discussed in detail.

First, a download instruction is transmitted from a terminal device such as work station 18 connected to the terminal-office equipment 10 in the office A. At this time, the download information to be transmitted has common information for the equipment in all offices and dedicated information for the given equipment. In the dedicated information, an office ID indicating a destination office of the dedicated information to be transmitted is included. On the other hand, after the common information is downloaded to all the offices, the dedicated information may separately be transmitted (downloaded).

The following description will show a case where the work station 18 in the office A transfers the download information to the office B, and the download information received in the office B is transferred to the office C.

First, the work station 18 in the office A establishes a connection with the second communication interface part 42 of the monitor-and-control part in the office to be downloaded (office B, in this case) through the communication line. In this case, the work station 18 operates as a server. After the connection with the office B is established, the download information transmitted from the work station 18 is transferred to the monitor-and-control part 25 in the office B through the communication line.

In the office B, the communication CPU 44 in the monitor-and-control part 25 of the reception side stores the download information in the ROM area connected to the bus. For the ROM, a write-enable-type memory such as a flash memory and EEPROM is usable.

Further, to prevent a normal operation from being influenced, the ROM is doubled with a regular ROM face and an opposite ROM face. Since the regular ROM face is currently being used, the downloaded information is written in the opposite ROM face. On the other hand, the download information is not directly transferred to the ROM, but may temporarily be transferred to another memory and may be transferred to the ROM area of each CPU. The download operation to the ROM3 and ROM4 of the monitor CPU 48 may be performed by writing the download information to the common memory part 50 by the communication CPU 44, and by writing the download information to the ROM3 and ROM4 by the monitor CPU 48.

When storage of the download information to the ROM area is completed, a signal indicating the completion is transmitted to the work station 18 in the office A.

Next, the monitor-and-control part 25 in the office B operates as the server, and transfers the received download information to the monitor-and-control part 35 in the office C. At this time, a connection for the information transferring is established between the first communication interface part 40 in the monitor-and-control part 25 and the first communication interface part 40 in the monitor-and-control part 35. After the connection is established, the download from the office B to the office C is carried out in the same way as that mentioned above. After storing of the download information is completed, the signal indicating the completion is transmitted to the office B of the server. The office B transmits the completion signal from the office C to the work station 18.

After the office A as a master supervisory office received the completion signals from all the offices, the office A instructs the offices to change the regular ROM face currently being used to the opposite ROM face where the new application program is stored. This instruction information is also transmitted in the same transferring order as that of the download information.

The above is a series of sequences for downloading the information.

Figure 7:
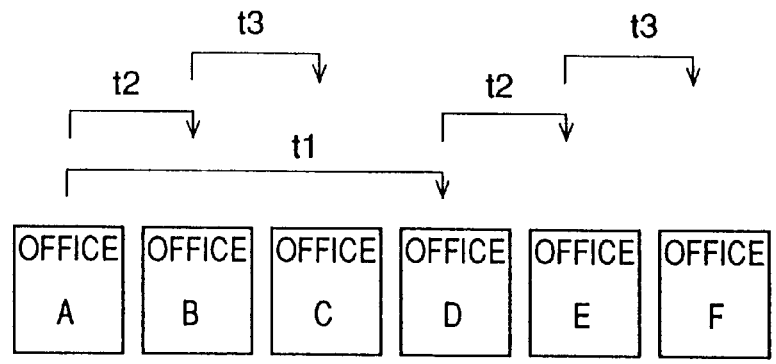
FIG. 7 shows an illustration for explaining an operation of a first embodiment of a downloading method according to the present invention.

Next, a description will be given of a first embodiment of the downloading method according to the present invention. FIG. 7 shows an illustration for explaining an operation of the first embodiment of the downloading method according to the present invention. FIG. 7 shows a case where the downloading method according to the present invention is applied to a network model having a plurality of offices A to F connected in series (linear structure). At an initial condition, the office A operates as the server.

In the downloading method according to the present invention, the server office downloads data to an intermediate office of the remaining offices (undownloaded offices). At the next timing, the office to which the data has been downloaded operates as the server, and from a plurality of servers, the download operations are carried out in parallel.

In FIG. 7, the offices A to F are connected in series. Now, a case where the download is carried out from the office A to the offices B to F will be discussed. The intermediate office of the offices B to F is the office D. Therefore, at a first timing t1, download from the office A to the office D is carried out. After the download from the office A to the office D is completed, the office D operates as the server.

At the next stage, download from the office A to the offices B, C and download from the offices D to the offices E, F needs to be carried out. For the download, an intermediate office of the offices B, C and an intermediate office of the offices E, F are determined. In this case, either of the office B and the office C may be the intermediate office, and either of the office E and the office F may be the intermediate office.

Therefore, at a second timing t2, for example, the download from the office A to the office B and the download from the office D to the office E are simultaneously carried out. After that, the office B and the office E also may operate as the servers. At a third timing t3, download from the office B to the office C and download from the office E to the office F are simultaneously carried out.

According to the prior-art downloading method, in the above-mentioned network model in which the offices are connected in series, timings t1 to t5 are required for the download from the office A to the offices B to F. On the contrary, in the downloading method according to the present invention, the download time for the download from the office A to the offices B to F is the timings t1 to t3. Therefore, according to the present invention, the download time may positively be approximately $\log_2 n$ times the download time for one office. As a result, by applying the downloading method according to the present invention, the download time may be extremely reduced as compared to the prior-art downloading method.

In the first embodiment, after the information data is downloaded to the office, the monitor-and-control part of the office may operate as the server, and further downloads received information data to another office. Therefore, each monitor-and-control part needs to store a download plan which indicates the destination office of the download. The download plan may be stored in the ROM1 and ROM2, or the RAM1 shown in FIG. 6.

When the network model is initially determined, the download plan is determined for each office. In the first embodiment, the download plan is previously determined by a manual method. When the network architecture is changed by addition of offices, etc., the download plan is newly determined by the manual method, and is transferred to each office to be stored in the memory.

After the download to one office is completed, the communication CPU 44 of the monitor-and-control part in the office establishes a connection with a given office based on data stored in the above-mentioned memory, and carries out the download to the given office.

Figure 8A:
FIG. 8A and FIG. 8B show illustrations for explaining a downloading order of the downloading method according to the present invention.
Figure 8B:
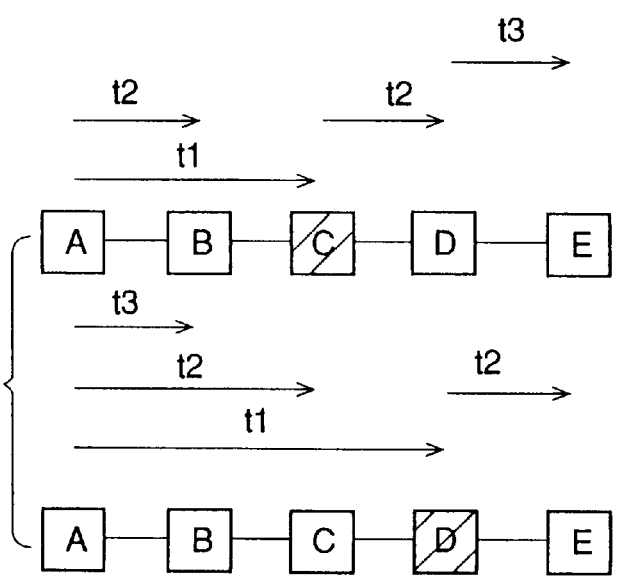

Next, a description will be given of a method of determining the above-mentioned download plan. FIG. 8A and FIG. 8B show illustrations for explaining a downloading order of the downloading method according to the present invention. FIG. 8A shows a case where a number of offices to be downloaded is an odd number, and FIG. 8B shows a case where a number of offices to be downloaded is an even number.

When the number of the offices to be downloaded is odd, as shown in FIG. 8A, the intermediate office may easily be determined to be the office D. When the number of the offices to be downloaded is even, as shown in FIG. 8B, the intermediate office may be the office C or the office D. In this case, even if either of the offices C and D is determined to the intermediated office, a total download time is the same.

Next, a description will be given of the communication LSI circuit (the first communication interface part shown in FIG. 6) used in the downloading method according to the present invention. As mentioned before, the download information is transmitted and received between the communication LSI circuits of the monitor-and-control parts in the offices. Therefore, though the terminal-office equipment in the offices A, C shown in FIG. 3 respectively have at least one communication LSI circuit, the transit-office equipment in the office B shown in FIG. 3 has a plurality of communication LSI circuits. However, in FIG. 1, when the download from the office A to the office C is carried out, the download information is transmitted through the office B. In this case, in the office B, the download information is directly transmitted between the multiplex/demultiplex parts without passing through the communication LSI circuit.

FIG. 9A and FIG. 9B show a method of establishing the connection in the downloading method according to the present invention. FIG. 9A shows a configuration of the connection, and FIG. 9B shows a control sequence. When the download information is transferred from the office A to the office C, the office A produces a through-control instruction to the office B. In the office B, in response to the through-control instruction, a through line in the signal transmission part without passing through the LSI circuit. In this way, the connection is established between the communication LSI circuit in the office A and the communication LSI circuit in the office C, and the download information is transferred through this connection.

Figure 9C:
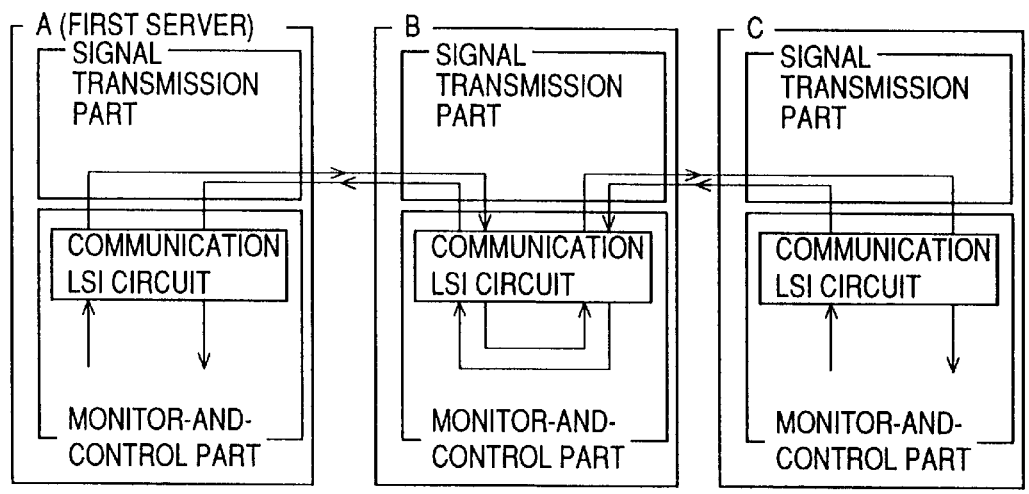
FIG. 9C and FIG. 9D show another method of establishing the connection in the downloading method according to the present invention.
Figure 9D:
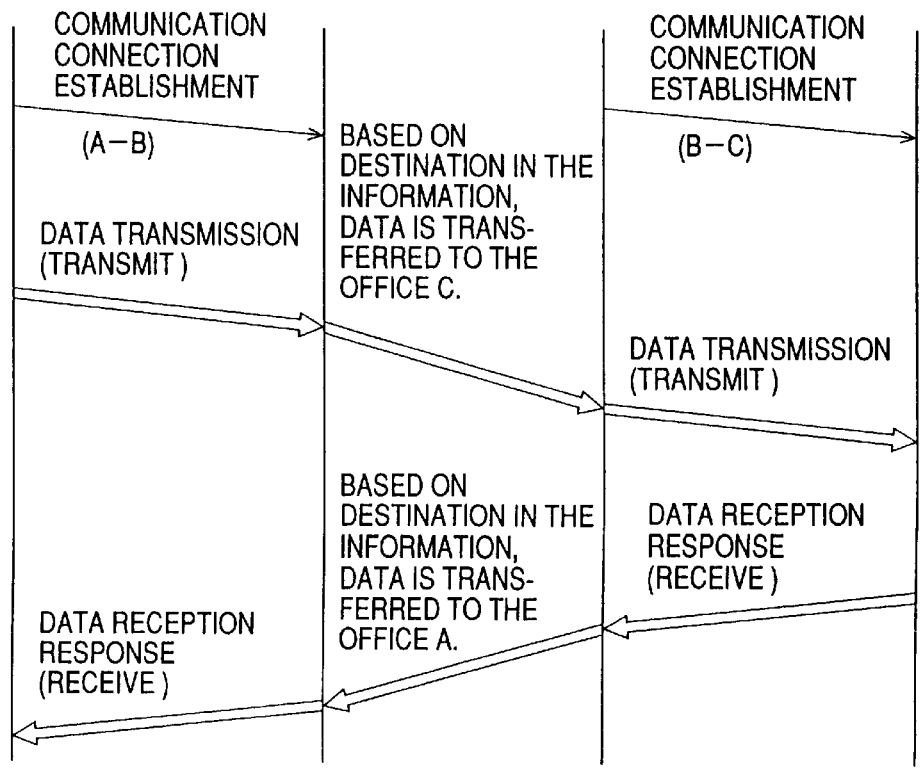

FIG. 9C and FIG. 9D show another method of establishing the connection in the downloading method according to the present invention. FIG. 9C shows a configuration of the connection, and FIG. 9D shows a control sequence. The method in FIG. 9C shows a case where the information is transferred from the office A to the office C through a communication LSI circuit individually provided in the transit office B.

When equipment in the offices is started up, each link between two offices adjacent to each other is established, the offices are prepared to transfer the information by the respective offices' communication LSI circuits (communication connection establishment condition). At this time, between the two offices adjacent to each other, the information shown in FIG. 5 is transmitted and received.

In the information, in addition to the information (the download information) to be transferred to each office, destination information indicating a destination office of information transference is also included.

In the transit office B positioned between the server office (office A) and the destination office (office C), once the download information is received, the download information is determined to be one for the office C based on the destination information. Therefore, the download information is directly transferred to the office C.

In the same way, the data reception response is transmitted from the office C to the office A through the communication LSI circuit in the office B. Such communication is commonly called a packet communication. The method of transferring the information through the transit office is not limited to the above-discussed configuration example, but is operable in other configuration examples.

Figure 10:
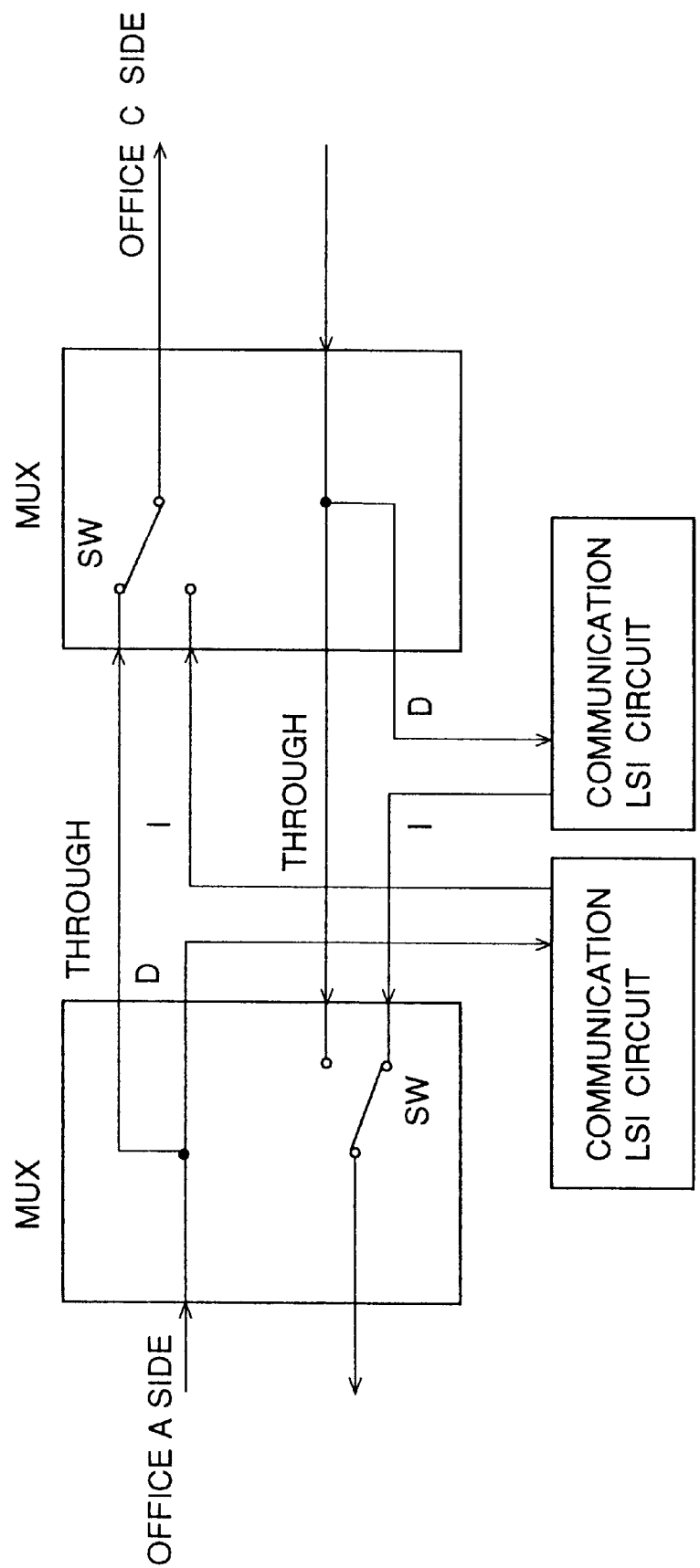
FIG. 10 shows a detail configuration of a through line in transit-office equipment shown in FIG. 3.

FIG. 10 shows a detail configuration of the through line in the transit-office equipment. In FIG. 10, to simplify the description, only the multiplex/demultiplex parts (MUXs) and the communication LSI circuits of the monitor-and-control part in the transit-office equipment are shown.

In the transit-office equipment, the through line is established between the multiplex/demultiplex parts. When the through line is established, only the download information in a control channel is transmitted through the through line without being dropped into the communication LSI circuits. The through line may be formed by switches such as relays. The switches may select whether passing the download information or dropping the download information into the communication LSI circuit and transmitting to the other office.

Next, a description will be given of a second embodiment of the downloading method according to the present invention. In the first embodiment of the downloading method, the destination offices of the download, namely the download plan, needs to manually be determined. Therefore, in this method, whenever the network architecture is changed, the download plan needs to be calculated for each office.

In the second embodiment of the downloading method, the download plan of each office is automatically calculated in that office. Therefore, information of the network architecture, namely, topology information in the network, is previously informed to each office. In the present invention, the second embodiment of the downloading method in which the download plan is calculated in each office is called a recursive-processing-type downloading method.

FIG. 11 shows a memory configuration storing the topology information of the network shown in FIG. 7. Each office has the topology information, and determines the destination office of the download based on the topology information. Each office knows a rule that a downloading order is shown as from a lowest-address-number (in this case, address 1) office in the memory to a higher-address-number office.

Further, when download is carried out to the intermediate office, the offices of the network are virtually divided into two groups, each group includes the office having the download information (the server office). When the next download is completed, each of the two groups are further divided into two groups. In this way, in the downloading method according to the present invention, a number of the server offices increases in a manner of a factorial of 2. Since the downloading operations are carried out in parallel by these server offices, the total download time may be reduced.

In this case, each office needs to always know temporal topology information which the offices of the network are virtually divided. Based on the temporal topology information, the next destination office of the download is determined. The temporal topology information is calculated by the following download algorithm, and is always stored in the RAM.

Figure 12:
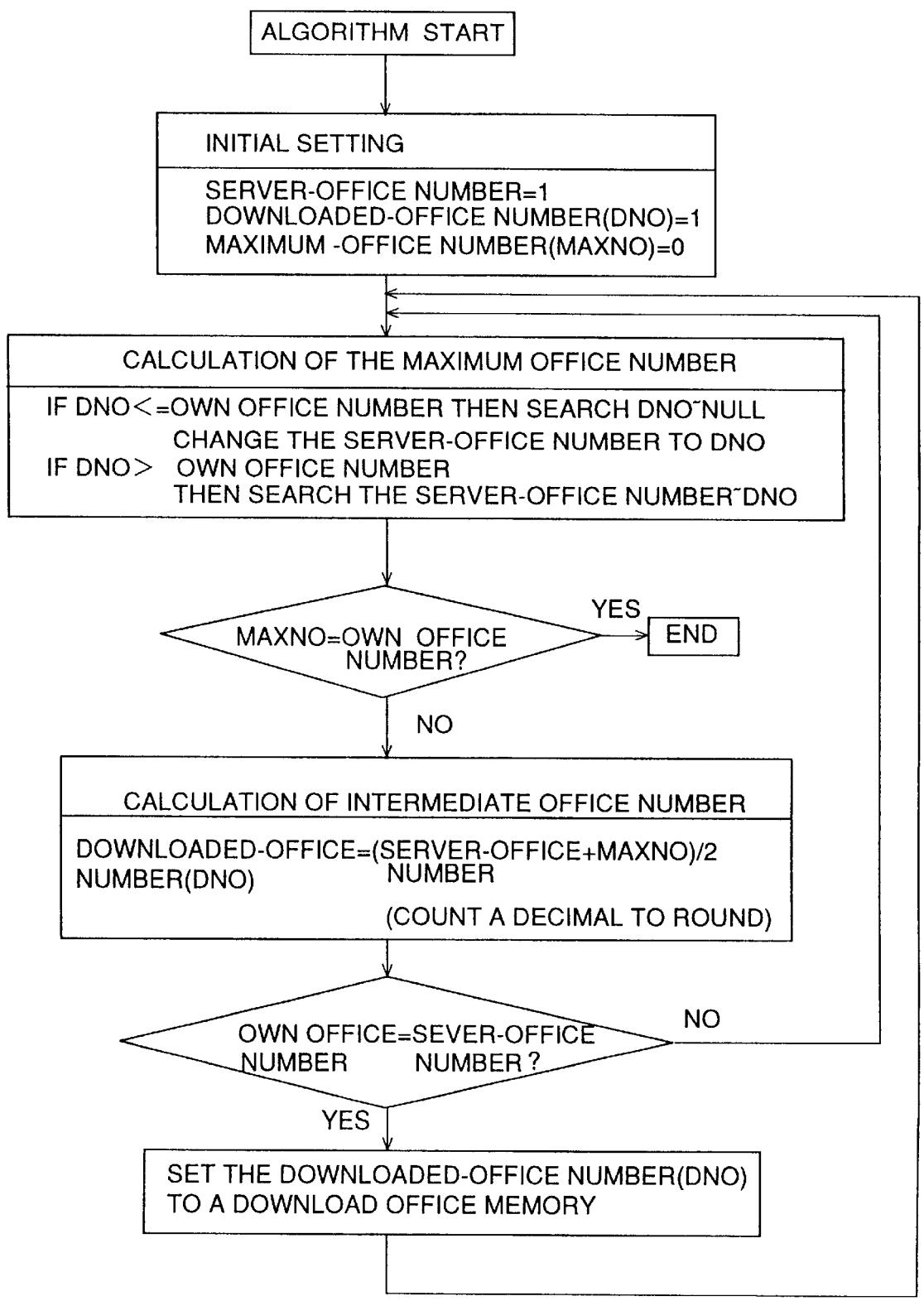
FIG. 12 shows a flowchart of a download algorithm which is provided in each office.
Figure 13:
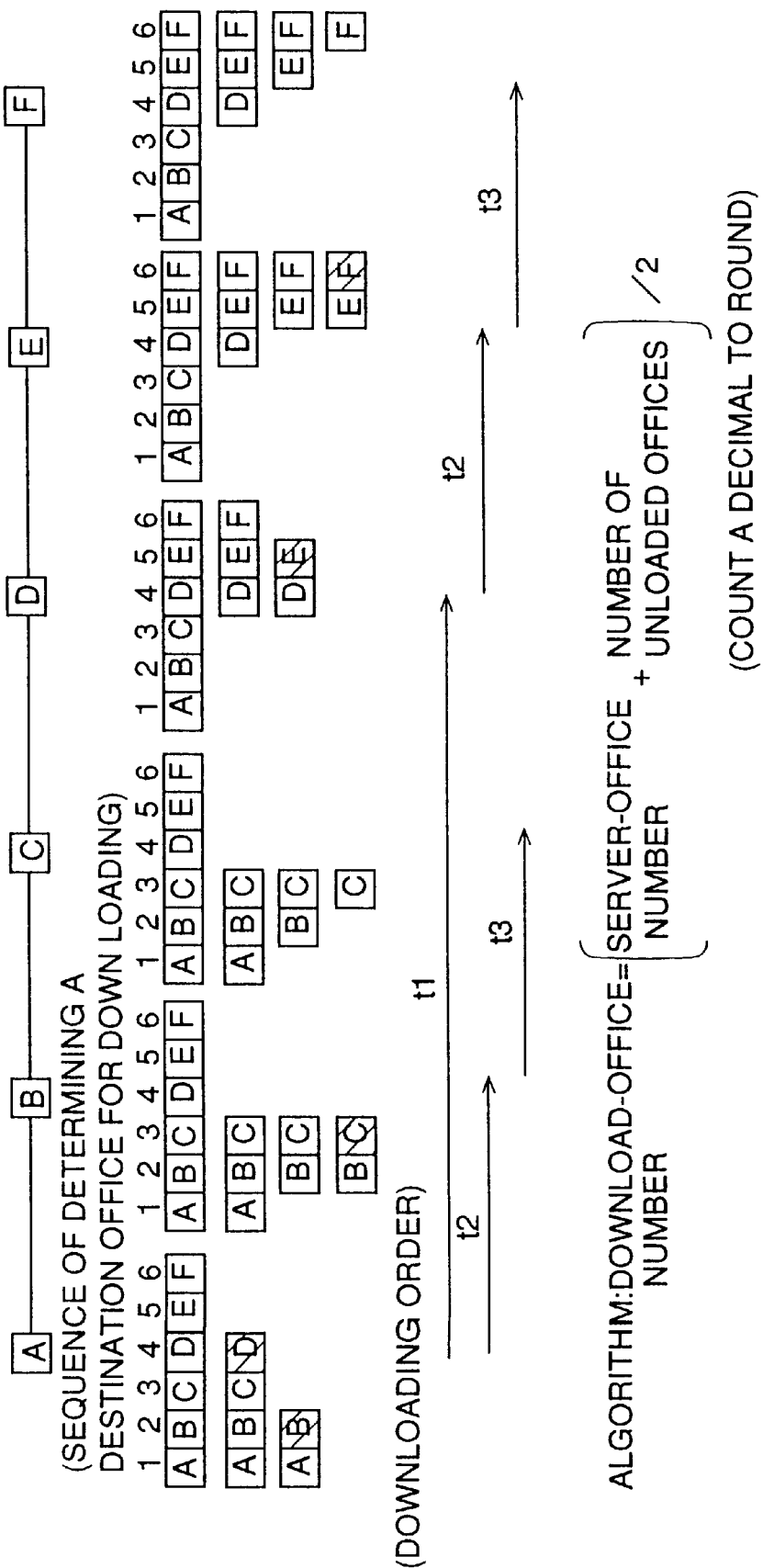
FIG. 13 shows an illustration for explaining a downloading operation of a recursive-processing-type downloading method based on the algorithm shown in FIG. 12.
Figure 14:
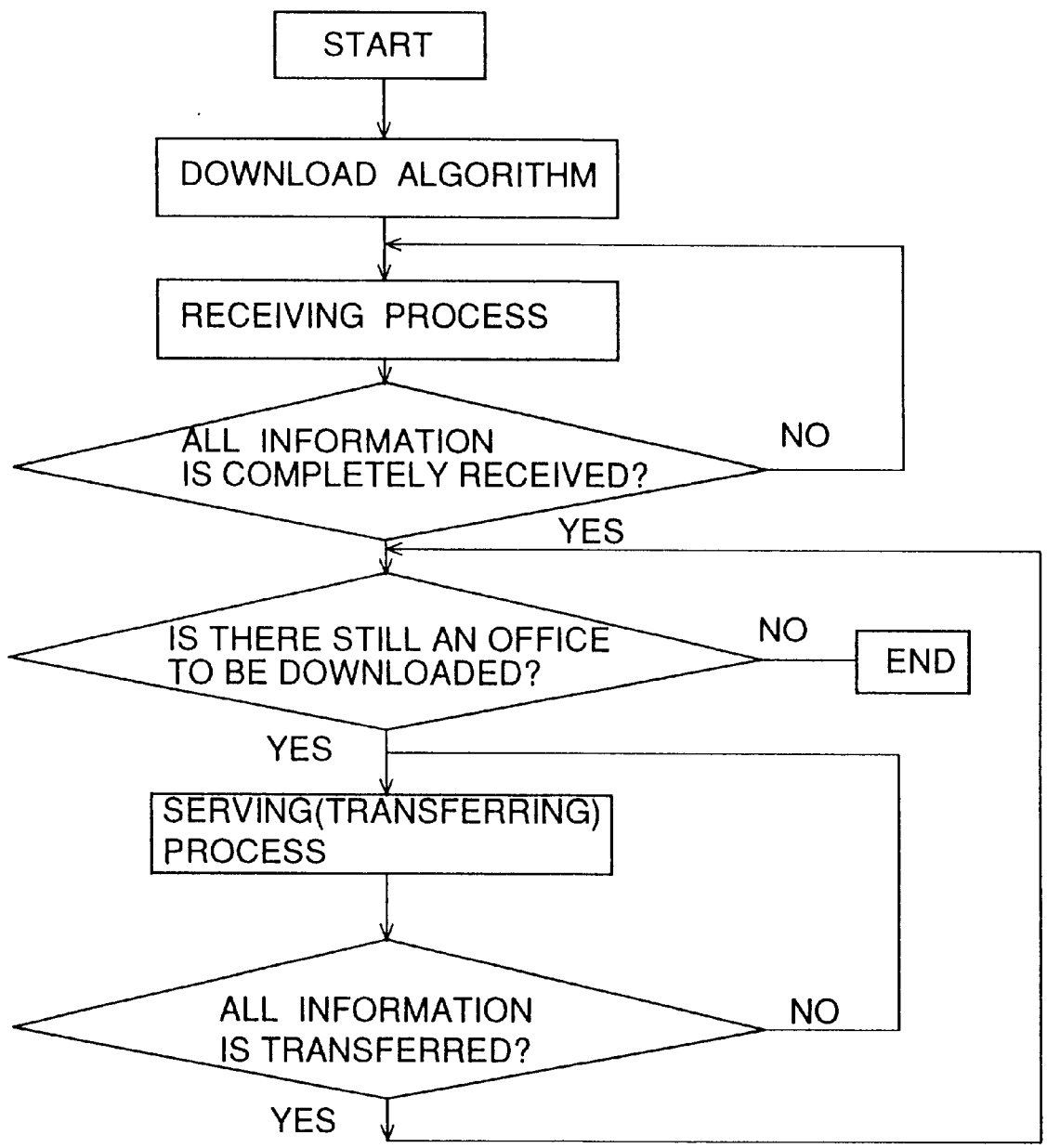
FIG. 14 shows a flowchart of the downloading operation in each office.

FIG. 12 shows a flowchart of the download algorithm which is provided in each office. FIG. 13 shows an illustration for explaining a downloading operation of the recursive-processing-type downloading method based on the algorithm shown in FIG. 12. FIG. 14 shows a flowchart of the downloading operation in each office.

According to the download algorithm shown in FIG. 12, each office, at a given timing, calculates a server-office number of the network topology, the destination-office number (intermediate office), and a maximum number of offices. FIG. 13 shows the downloading operation in the offices A to F connected in series with the temporal topology information which is calculated by the algorithm shown in FIG. 12. Each office carries out the algorithm shown in FIG. 12 for each download timing, and calculates the temporal topology information at that timing.

Next, according to the flowchart shown in FIG. 14, based on the temporal topology information, the office carries out reception of the download information, transmission of the download information, establishment of the through line, and a completion operation. In the following, by referring to the FIG. 13, an operational sequence of the recursive-processing-type downloading method is discussed.

At a timing t0 before the download, each office has the topology information shown in FIG. 11. First, the topology information is written such that the server-office number=1, the destination-office number=4, and the maximum number of the offices=7. At the next timing t1, the first download is carried out. At this time, each office can know that the download information is downloaded to the office D at the timing t1 based on the topology information at the timing t0.

Further, at the timing t1, according to the download algorithm, the topology information at the timing t0 is virtually divided into two temporal topology information, first temporal topology information being constructed with the offices A to C including the server office A, and second temporal topology information being constructed with the offices D to F including the server office D. Each office has corresponding temporal topology information.

Therefore, at the next timing t2, in each office, based on the temporal topology information, the download algorithm is carried out, and the next destination office is determined. Shadowed parts shown in FIG. 11 indicate the destination offices of the download in each office.

At the timing t2, the topology information constructed with the offices A to C is divided into the office A and the offices B, C. In the same way, the topology information constructed with the offices D to F is divided into the office D and the offices E, F.

At the next timing t3, the topology information constructed with the offices B, C is divided into the office B and the office C. In the same way, the topology information constructed with the offices E, F is divided into the office E and the office F. At last, when the topology information having the offices A to C is divided into 6 topology information, each of which having an individual office, all the offices may have the download information.

In the flowchart shown in FIG. 12, when the number of the offices is even, the algorithm is designed such that the download is carried out to the office closer to the server office. However, the download may be carried out to the office farther from the server office. This method may be performed by changing an equation for calculating the intermediate office to the following equation.

Destination-office number =

$$((\text{server-office number} + \text{maximum number of offices})/2) + 1$$

where a decimal is counted to round off the number.

As mentioned above, in the second embodiment, when the network architecture is changed, each office may easily obtain the information in relation to the next destination office for the download by an individual office's calculation. Therefore, even if the network architecture is changed, only by transferring the topology information of the initial network architecture to each office, the downloading operation may be easily carried out.

Figure 15:
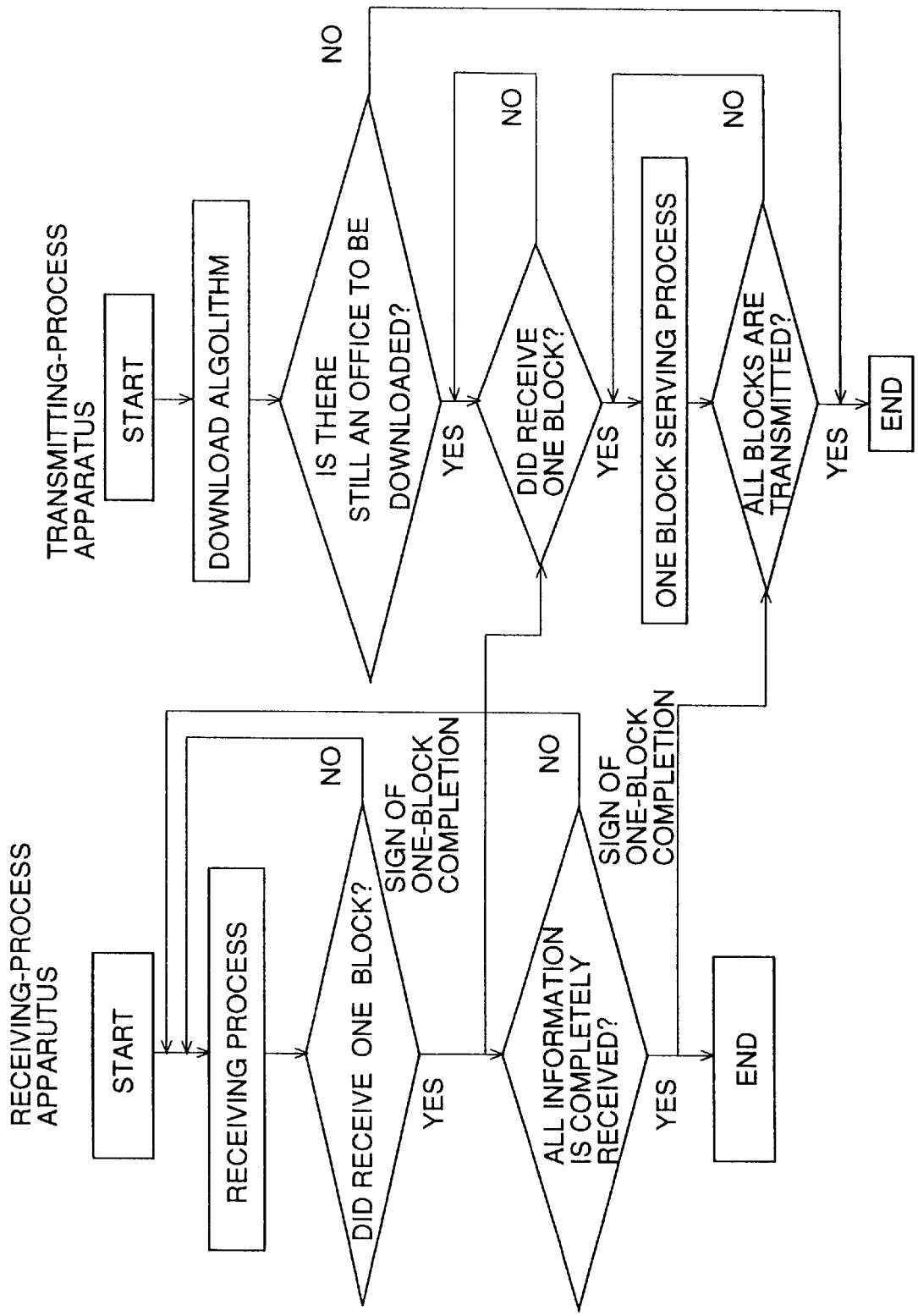
FIG. 15 shows a flowchart of a transmitting-and-receiving parallel process in a third embodiment of the downloading method according to the present invention.

Next, a description will be given of a third embodiment of the downloading method according to the present invention. FIG. 15 shows a flowchart of a transmitting-and-receiving parallel process in the third embodiment of the downloading method according to the present invention. In the first and second embodiments, the method of downloading one download information to all offices is shown. Therefore, only after the office completely received the downloaded information, the office can transfer the downloaded information to another office.

In the third embodiment, the download information is divided into a plurality of blocks, and the blocks are downloaded in parallel. Every time each office receives one block, the office transfers the block to the next office. In this case, with receiving a first block, the office can transfer a second block. Namely, in each office, the receiving process and the transmitting process may be carried out in parallel. In the above-mentioned method, since an error control, etc., are carried out at any time, communication processing equipment for two lines are required.

According to the third embodiment, the download information is divided into the plurality of blocks, and for each block, the transmitting process and the receiving process are carried out in parallel. Therefore, the download time may be further reduced as compared to the previously mentioned two embodiments.

Next, a description will be given of a fourth embodiment of the downloading method according to the present invention. The fourth embodiment is given by adding a completing process sequence to either of the above three embodiments.

In any downloading method, to confirm whether the download information is regularly transferred to all offices, each office needs to return a response indicating regular completion to the server office. However, when all offices return a plurality of responses to the server office at random, traffic overlapping in the transmission path and collision between the responses occur. For example, in the network model shown in FIG. 7, when the download from the office A to the office B and the download from the office D to the office E are carried out at the timing t2, if the offices B and E simultaneously return the responses to the offices A and D, respectively, a traffic overlapping in the transmission path occurs between the office A and the office B. Whereby, efficiency of the downloading operation is degraded.

Figure 16:
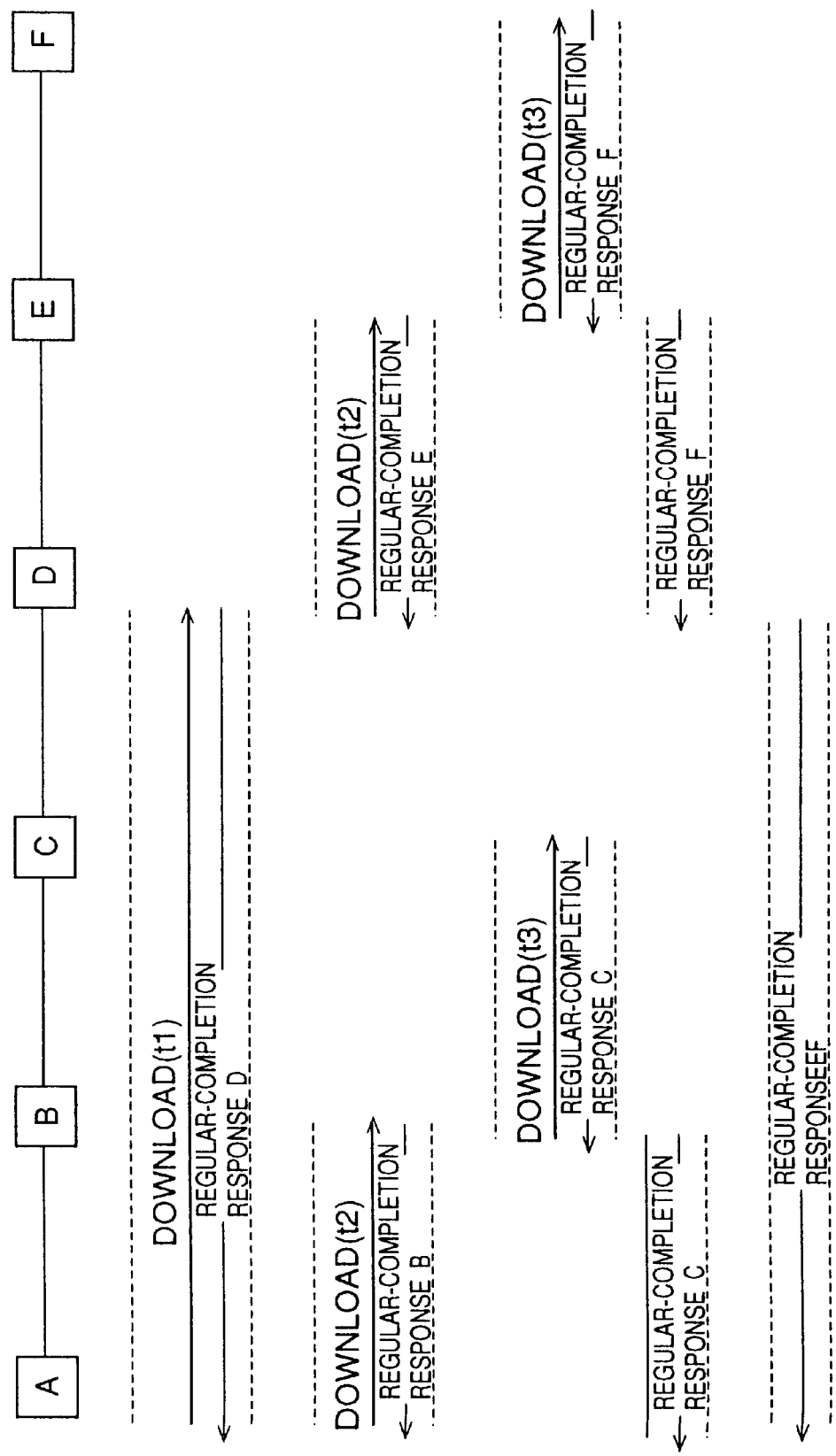
FIG. 16 shows an illustration of explaining a responding method in the downloading method according to the present invention.

FIG. 16 shows an illustration of explaining a responding method in the downloading method according to the present invention. In this responding method, when the download information is downloaded to the office, the office immediately returns the regular completion response to the server office through the connection established for the downloading operation. An office which received the completion response receives all responses from associated offices. When the office receives all the responses, the office transmits response information having all the responses from the associated offices to the server office of itself. If no response from the associated offices is returned to the office, information of no response from the associated offices is also transferred to the server office. In this way, without degrading the efficiency of the downloading operation, the response of the regular completion may be returned.

In the above-mentioned four embodiments, the initial destination office for the downloading operation is set to the intermediate office between the offices to be downloaded. In this way, by downloading to the intermediate office, the most efficient downloading operation may be realized. However, the downloading method according to the present invention is not limited to the above case where the download is carried out to the precisely-calculated intermediate office. Another case where the download is carried out to the substantially-intermediate office is also included in the scope of the present invention.

In the above-discussed embodiments, the downloading method according to the present invention has been described for the network in which the plurality of offices are connected in series. However, a practical network commonly has a complex configuration.

Figure 17:
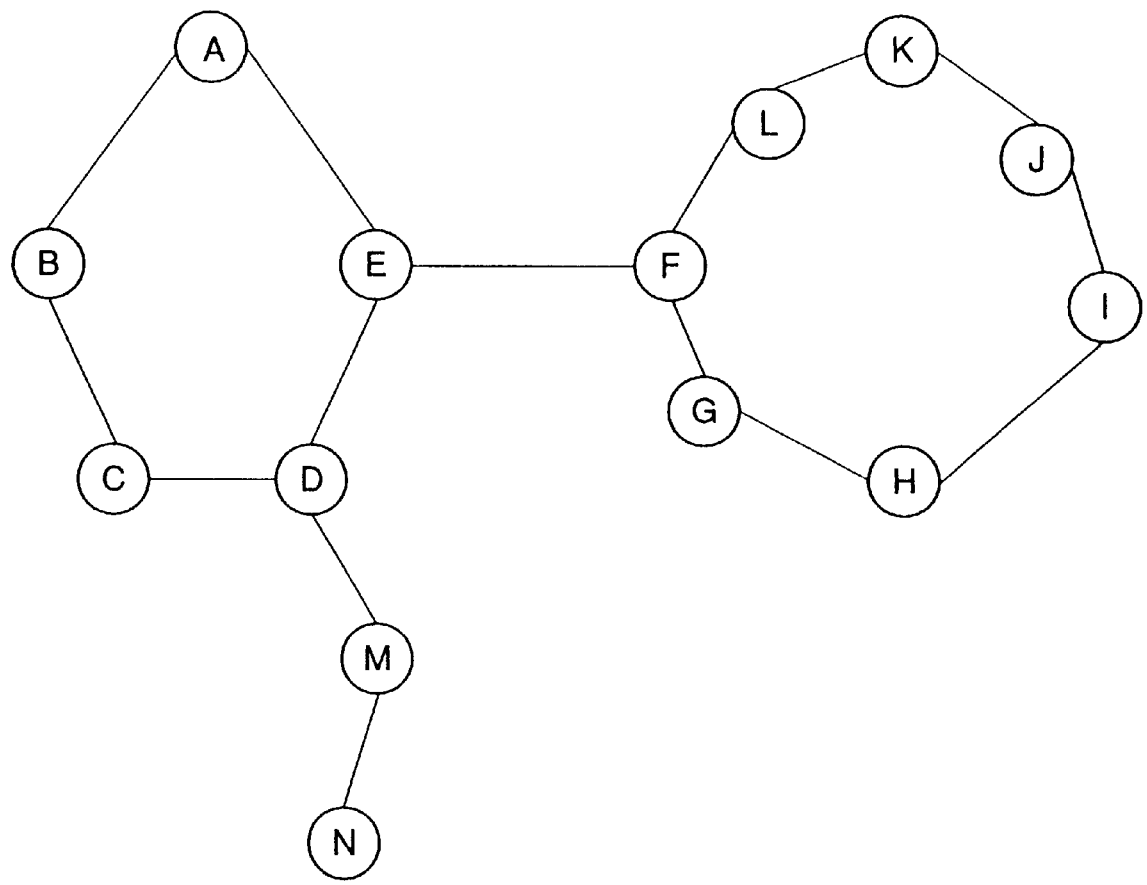
FIG. 17 shows a configuration example of a typical main transmission network.

FIG. 17 shows a configuration example of a typical main transmission network. The main transmission network shown in FIG. 17 is constructed with offices A to N. In the network, the offices A to E, and the offices F to L are formed respectively in ring forms. The offices M, N forms a branch from the office D. In such a complex network, all the offices are not connected in series. Therefore, the present invention may not directly be applied to all the offices in the network. However, any complex network may be virtually analyzed into a network which is constructed with a plurality of offices connected in series (linear structure). Therefore, by virtually analyzing the network into a plurality of serially-connected offices, the present invention is applicable to that complex network.

Figure 18B:
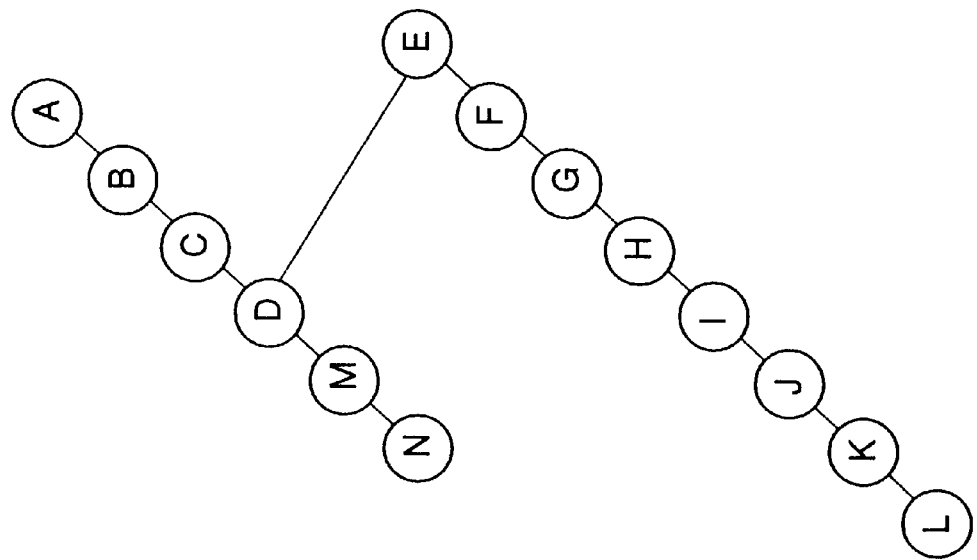
FIG. 18A and FIG. 18B show examples of a method of virtually analyzing the complex network shown in FIG. 17.
Figure 18A:
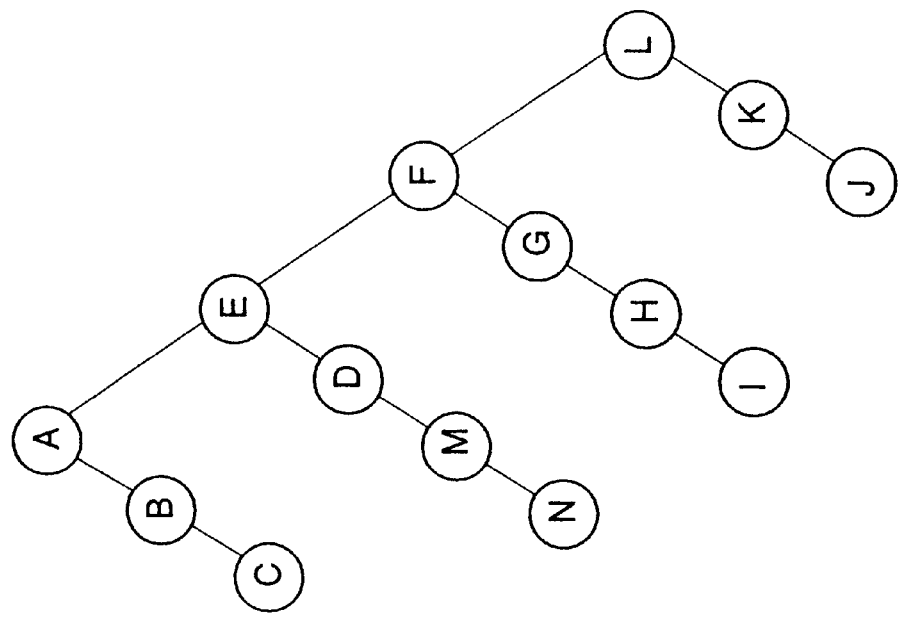

FIG. 18A and FIG. 18B show examples of the method of virtually analyzing the complex network shown in FIG. 17. In these networks shown in FIG. 18A and FIG. 18B, each network has a plurality of branches. Each branch further include a plurality of offices connected in series.

In FIG. 18A, the offices A to C are connected in series, and the offices A to J are connected in series. In the same way, the offices E to N, and the offices F to I are respectively connected in series.

In FIG. 18B, the offices A to N are connected in series, and the offices D to L are connected in series. The present invention is applicable to each of the serially-connected offices. Therefore, the downloading method according to the present invention is applicable to any complex network.

Further, the present invention is not limited to these embodiments, but other variations and modifications may be made without departing from the scope of the present invention.

What is claimed is:

1. An apparatus for transmitting information from a server office to a plurality of offices connected in series in a network, said apparatus comprising:

receiving means for receiving said information; and transferring means for first transferring said received information to an intermediate office which is in said series and located at least a non-adjacent second office away from said server office, another office in said series being interpopsed between said server office and said intermediate office, said intermediate office functioning as a new server office and downloading the information received by the receiving means to additional offices located in said series at a downstream side of the intermediate office, wherein said transferring means also transfers said received information to at least one office located in said series at an upstream side of said intermediate office.

2. The apparatus as claimed in claim 1, wherein said apparatus further comprises a memory storing which office in said plurality offices is said intermediate office.

3. The apparatus as claimed in claim 1, wherein said apparatus further comprises calculating means for determining which office in said plurality offices is said intermediate office based on a network architecture.

4. The apparatus as claimed in claim 1, wherein said apparatus further comprises parallel-process control means for dividing said information into a plurality of blocks, and transmitting one block of said blocks to a next office every time said one block is received.

5. The apparatus as claimed in claim 1, wherein said apparatus further comprises:

first responding means for returning a response indicating a regular completion of receiving said information to an office which transferred said information to said apparatus; and second responding means for receiving a plurality of said responses from other offices and for returning said plurality of responses to an office which previously transferred said information to said apparatus.

6. The apparatus as claimed in claim 1, wherein said transferring means comprises means for downloading software to said intermediate office.

7. The apparatus as in claim 1, wherein said server office and said plurality of offices are connected in said series.

* * * * *